(12) United States Patent
Sellers et al.

(10) Patent No.: US 7,840,490 B1
(45) Date of Patent: Nov. 23, 2010

(54) COMPREHENSIVE SOFTWARE LICENSING MANAGEMENT SYSTEM

(75) Inventors: Barbara Brooks Sellers, San Antonio, TX (US); Ronald Nathan Gee, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/514,005

(22) Filed: Aug. 30, 2006

(51) Int. Cl.
*G06F 21/00* (2006.01)
(52) U.S. Cl. ....................................................... 705/59
(58) Field of Classification Search .................... 705/59
See application file for complete search history.

(56) References Cited

U.S. PATENT DOCUMENTS

| | | |
|---|---|---|
| 6,189,146 B1 | 2/2001 | Misra et al. |
| 6,584,454 B1 | 6/2003 | Hummel et al. |
| 7,139,736 B2 | 11/2006 | Stefik et al. |
| 7,139,737 B2 | 11/2006 | Takahashi et al. |
| 2001/0013024 A1 | 8/2001 | Takahashi et al. |
| 2002/0161718 A1 | 10/2002 | Coley et al. |
| 2003/0088516 A1 | 5/2003 | Remer et al. |
| 2004/0034603 A1* | 2/2004 | Hastings et al. ............... 705/63 |
| 2004/0098715 A1* | 5/2004 | Aghera et al. ............... 717/173 |
| 2004/0193545 A1* | 9/2004 | Shlasky ........................ 705/59 |
| 2004/0254889 A1 | 12/2004 | Tanaka et al. |
| 2005/0108556 A1* | 5/2005 | DeMello et al. .............. 713/189 |
| 2005/0289072 A1* | 12/2005 | Sabharwal .................... 705/59 |
| 2006/0059100 A1* | 3/2006 | Ronning et al. ............... 705/59 |
| 2007/0233782 A1* | 10/2007 | Tali ............................. 709/203 |
| 2008/0077507 A1* | 3/2008 | McElhiney et al. ........... 705/27 |
| 2008/0091774 A1* | 4/2008 | Taylor et al. ................. 709/203 |
| 2008/0126226 A1* | 5/2008 | Popkiewicz et al. ........... 705/27 |

OTHER PUBLICATIONS

About Intelligent Gadgets, LLC, "Intelligent Gadgets Announces Immediate Availability of syncVUE Windows: Innovative SKYPE-Based Digital Media Review and Approval Collaboration," *DMN Newswire*, http://finalcutpro.digitalmedia.com/articles/viewarticle.jsp?id=68368, Sep. 25, 2006, downloaded Nov. 10, 2006, 2 pages.
Open Channel Solutions, "POETIC Core: Optimizing Software Licensing Management," http://www.ocs.com/poetic-poetic-core.htm, 2006, downloaded Nov. 10, 2006, 1 page.
SafeNet Inc., "Software License Management with Sentinel RMS," http://www.safenet-inc.com/products/sentinel/Sentinel_RMS.asp, 2006, downloaded Nov. 10, 2006, 2 pages.

* cited by examiner

*Primary Examiner*—Pierre E Elisca
(74) *Attorney, Agent, or Firm*—Brooks, Cameron & Huebsch, PLLC

(57) ABSTRACT

The described embodiments contemplate a system, method and computer-readable medium with computer-executable instructions for managing licensed commodities. The novel system comprises an installed software database having licensing terms. The system further includes an owner module and an asset management module that communication with the installed software database. The system includes a client device that provides a request for software to the installed software database for processing.

19 Claims, 13 Drawing Sheets

Software Request

General Information

Requested Delivery Date: 04/28/2005

Requestor and Point of Contact Information

| Name | Employee ID | Phone | Email |
|---|---|---|---|
| Requestor: Jane Doe (Person submitting the request) | 0033333 | 913-0000 | jane.doe@usaa.com |
| Manager: John Smith (Requestor's manager) | 0044444 | 913-1111 | john.smith@usaa.com |
| Point of Contact: Jane Doe | 0033333 | 913-0000 | jane.doe@usaa.com |

Change Point of Contact

Billing Information

Unit Code: 07700
Project Code: (OPTIONAL)
Component Code: C1000

Project Phase: -Select-

Platform

Platform: Desktop

[Cancel] [Next]

Software Selection List

| Software | Waiver Required | Waiver Type | EMG Approver | |
|---|---|---|---|---|
| Business Analysis Modeler | No | N/A | N/A | Remove |
| SMS Package(s) | | | | |
| (10455) Acrobat Reader | No | N/A | N/A | Remove |

Previous  Cancel  Next

701

Software Selection List

| Software | Waiver Required | Waiver Type | EMG Approver | |
|---|---|---|---|---|
| Microsoft Visio | Yes | Network Tools | Kojo Ofswfab | Change Remove |
| | Process Modeling | | | |
| SMS Package(s) | | | | |

Software Request
Verification

Requested Delivery Date: 05/10/2005

Requestor and Point of Contact Information

| | Name | Employee # | Phone | Email |
|---|---|---|---|---|
| Requester Information (Person submitting the request) | Usoful Nisdis | 25496 | (321)024-5622 | peoplesoft_hrtest@usaa.com |
| Manager Information (Requestor's manager) | Tessz-Cpfdlfsmnbeo | 91045 | (321)024-0415 | peoplesoft_hrtest@usaa.com |
| Point of Contact: | Usoful Nisdis | 25496 | (321)024-5622 | peoplesoft_hrtest@usaa.com |

Billing Information
Unit Code: 07700
Component Code: C1000

Platform
Platform: Desktop

Software Selections
Quantity: 1

Software Selection

| Application(s) | Waiver Required | Waiver Type | Waiver Expiration | Enc Approver | Application Owner Notified |
|---|---|---|---|---|---|
| Business Analysis Modeler | No | N/A | | N/A | Sadlen Damkeler |
| SW6 Package | | | | | |
| (104955) Acrobat Reader | No | N/A | | N/A | Tutufo Zoneu |

LTerm List

| Name | Lterm | Location | | | Laptop |
|---|---|---|---|---|---|
| Additional Recipient: Usoful Nisdis | L60837894 | B03E.D2.B03.15 | | | No |

Software Installation Instructions
Comments or Instructions:

[Previous] [Cancel] [Submit]

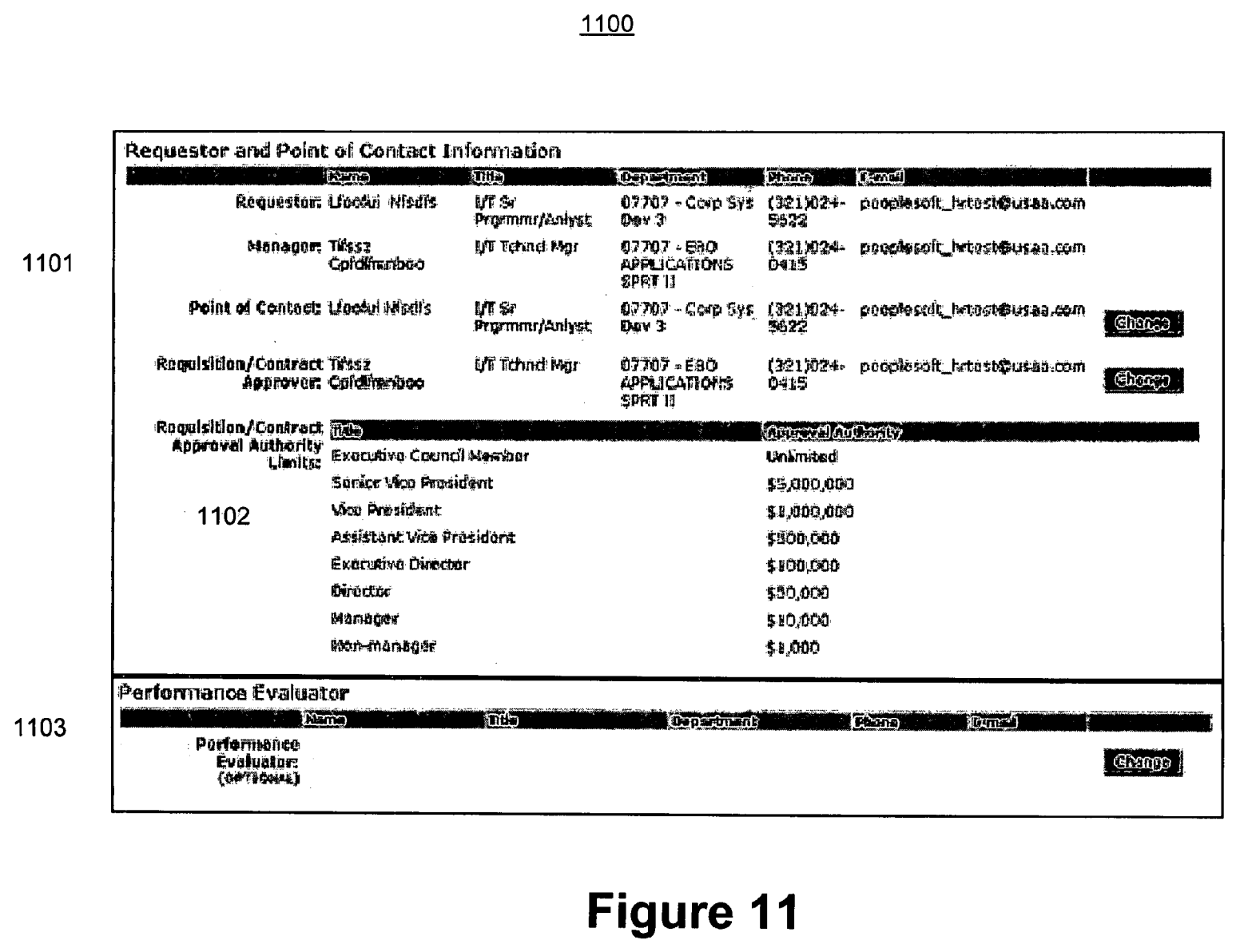

Requestor and Point of Contact Information

| | Name | Title | Department | Phone | Email | |
|---|---|---|---|---|---|---|
| Requestor: | Lincoln Misfits | I/T Sr Prgrmr/Anlyst | 07707 - Corp Sys Dev 3 | (321)024-5932 | peoplesoft_brtest@usaa.com | |
| Manager: | Tilssz Colditumboo | I/T Tchncl Mgr | 07707 - E&O APPLICATIONS SPRT II | (321)024-0415 | peoplesoft_brtest@usaa.com | |
| Point of Contact: | Lincoln Misfits | I/T Sr Prgrmr/Anlyst | 07707 - Corp Sys Dev 3 | (321)024-5922 | peoplesoft_brtest@usaa.com | Change |
| Requisition/Contract Approver: | Tilssz Colditumboo | I/T Tchncl Mgr | 07707 - E&O APPLICATIONS SPRT II | (321)024-0415 | | Change |

Requisition/Contract Approval Authority Limits

| Title | Approval Authority |
|---|---|
| Executive Council Member | Unlimited |
| Senior Vice President | $5,000,000 |
| Vice President | $1,000,000 |
| Assistant Vice President | $500,000 |
| Executive Director | $100,000 |
| Director | $50,000 |
| Manager | $10,000 |
| Non-manager | $1,000 |

Performance Evaluator

| | Name | Department | Phone | Email | |
|---|---|---|---|---|---|
| Performance Evaluator (optional) | | | | | Change |

Figure 11

Software Contract Request

Verification

Requestor and Point of Contact Information

| Name | Employee # | Phone | E-mail |
|---|---|---|---|
| Requestor: Lfoofui Nfsdfs (Person submitting the request) | 25496 | (432)678-4761 | peoplesoft_hrtest@usaa.com |
| Manager: Efoojt Qfsljot (Requestor's manager) | 33420 | (321)024-3064 | peoplesoft_hrtest@usaa.com |
| Point of Contact: Lfoofui Nfsdfs | 25496 | (432)678-4761 | peoplesoft_hrtest@usaa.com |
| Approver: Efoojt Qfsljot | 33420 | (321)024-3064 | peoplesoft_hrtest@usaa.com |

Performance Evaluator
Performance Evaluator:

Billing Information
Unit Code: 07700
Component Code: C1000

Platform
Platform: Desktop

Request Description
Request Description:

Request Detail
- BPMP Related: Yes
- Statement of Work: Yes
- Outsourcing Request: Yes
- Will USAA share data No with an external vendor:
- Share member data with No an external vendor:
- Share member/employee health data with an external vendor: No
- Contract Begin Date:
- Term of Contract: 36
- Estimated Value of Contract: 1000000
- Current Supplier:

Source Detail
- Is this a Single/Sole Source Request: No 1301
1302
1303

Previous | Cancel | Submit

COMPREHENSIVE SOFTWARE LICENSING MANAGEMENT SYSTEM

CROSS-REFERENCE TO RELATED APPLICATIONS

This application is related by subject matter which is disclosed in the following commonly assigned applications: U.S. patent application Ser. No. 11/626,109, U.S. patent application Ser. No. 11/514,034, U.S. patent application Ser. No. 11/514,033, U.S. patent application Ser. No. 11/514,035, all filed on Aug. 30, 2006 and all entitled "Comprehensive Software Licensing Management System," the entirety of each application is hereby incorporated by reference herein.

BACKGROUND

Over the past twenty years, software has moved from being a simple one-time ad hoc expenditure to becoming part of a company's overall assets. Of course, software purchases involve many other property interests, including the licenses that accompany the purchase. These licenses include both single and multiple license arrangements. For example, "boxed" software supplied with the software media normally allows a single installation of the software. Also, software that comes already stored on a personal computer typically has an associated "OEM" or original equipment manufacturer license. Also, a volume license includes software that allows multiple installations or multiple uses of the software.

There are numerous volume license options that vary depending on the type of software, the way in which the software is used and the particular manufacturer. For example, there are installation licenses that allow installation of the software on a specific number of computers. Also, there are "per processor" licenses that are based on the number of processors in a server machine, for example, on which the software is installed. In addition, there are concurrent user licenses, typically for networked computers, that allow software to be installed on any number of machines, although typically only a certain number of users may use the software at the same time.

Often, in many organizations, because software is purchased on an as-needed and ad hoc basis, these license interests are not accounted. In many instances, depending upon the size of the organization, a business may not be aware of the number of licenses or even the type of software that it has purchased. As a result, software licenses may be underutilized, or perhaps software license agreements may be unwittingly violated by unauthorized users.

As with any asset, but especially an asset as multi-faceted as software, it is desirable to institute processes that manage software in a way that allows for efficient usage, ensures necessary compliance with licenses, manages installations, forecasts software lifecycle, and streamlines the procurement process, for example. Also, such processes should permit the organization to benefit from accurately determining need and obtaining beneficial volume discounts. Similar techniques can be used for managing other commodities and other computer resources, including hardware, for example.

SUMMARY

The described embodiments contemplate a system, method and computer-readable medium with computer-executable instructions for managing licensed commodities. The novel system comprises an installed software database having licensing terms. The system further includes an owner module and an asset management module that communication with the installed software database. The system includes a client device that provides a request for software to the installed software database for processing.

The disclosed embodiments include a system, method, and computer-readable medium for managing licensed commodities. The system comprises a first subsystem for storing information related to software, a second subsystem for associating a licensing term with the software, a third subsystem for communicating with an owner system, an asset management system, and a client device, and a fourth subsystem for processing a request for the software received from the client device.

BRIEF DESCRIPTION OF THE DRAWINGS

The foregoing summary, as well as the following detailed description, is better understood when read in conjunction with the appended drawings. For the purpose of illustrating the claimed subject matter, there is shown in the drawings example constructions of various embodiments; however, the invention is not limited to the specific methods and instrumentalities disclosed. In the drawings:

FIG. 6 provides an example of a data entry sheet for entering general information related to a software request;

FIG. 7 provides an example of a data entry sheet for selecting software related to a software request;

FIG. 8 provides an example of a data entry sheet for identifying recipients related to a software request;

FIG. 9 provides an example of a data entry sheet for providing verification of a software request;

FIG. 11 provides an example of a data entry sheet for entering information of contract terms associated with negotiations related to software request;

FIG. 12 provides an example of a data entry sheet for providing verification of contract terms associated with negotiations related to a software request; and FIG. 13 provides an example of a data entry sheet for providing details of contract terms associated with negotiations related to a software request.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
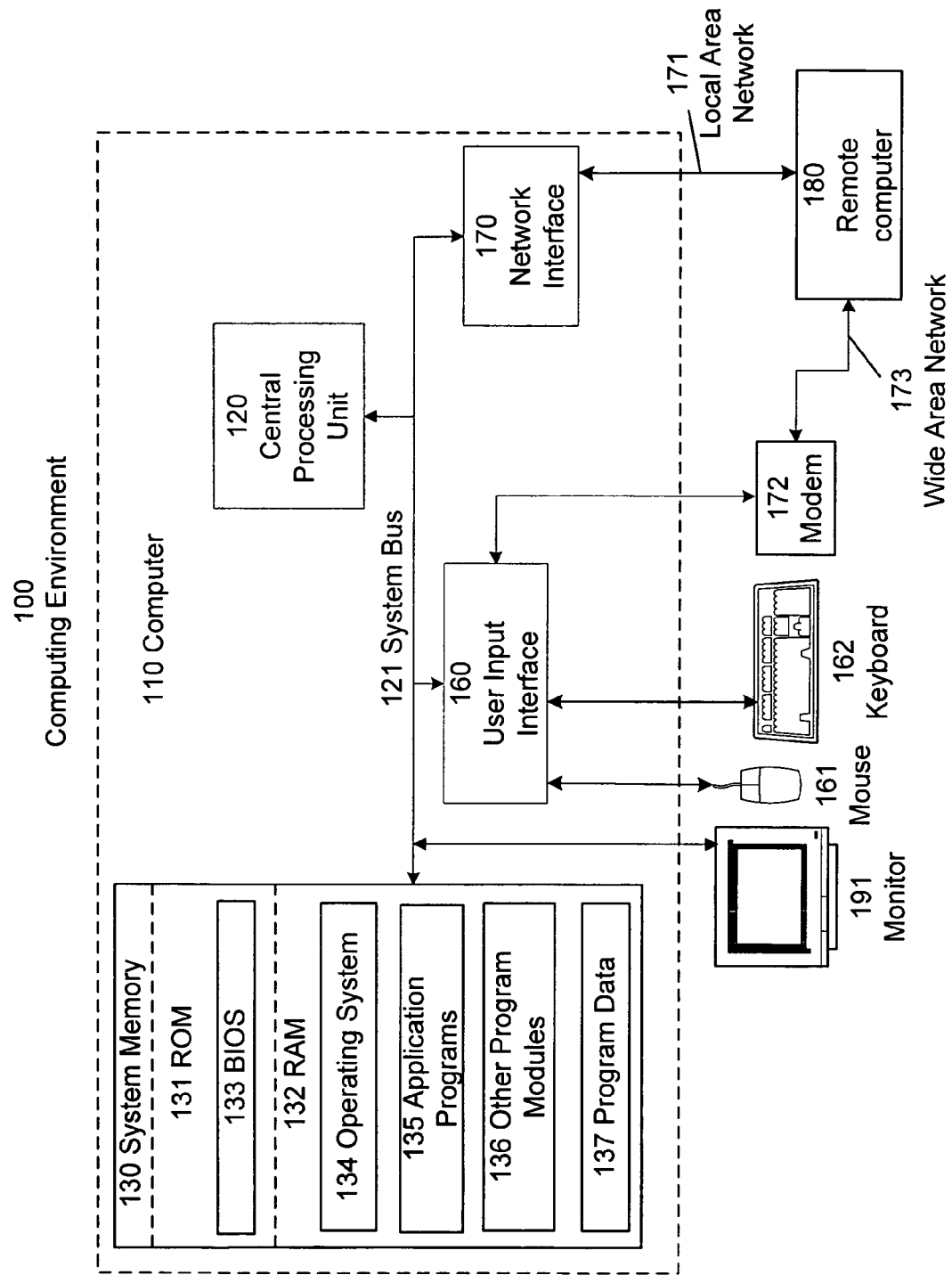
FIG. 1 is a block diagram of an example computing environment in which an example embodiment may be implemented.

FIG. 1 depicts an example computing environment 100 in which an example embodiment may be implemented. Computing environment 100 may include computer 110, monitor 191 and other input or output devices such as mouse 161, keyboard 162 and modem 172. Computers and computing environments such as computer 110 and computing environment 100 are known to those skilled in the art and thus are briefly described here.

An example system for implementing an embodiment includes a general purpose computing device in the form of computer 110. Components of computer 110 may include central processing unit 120, system memory 130 and system bus 121 that couples various system components including the system memory to processing unit 120.

System memory 130 may include computer storage media in the form of volatile and/or nonvolatile memory such as ROM 131 and RAM 132. A basic input/output system 133 (BIOS) containing the basic routines that help to transfer information between elements within computer 110, such as during start-up, may be stored in ROM 131. RAM 132 typically contains data and/or program modules that are immediately accessible to and/or presently being operated on by central processing unit 120. System memory 130 additionally may include, for example, operating system 134, application programs 135, other program modules 136 and program data 137.

Embodiments may be implemented in computing environment 100 in the form of any of a variety of computer readable media. Computer readable media can be any media that can be accessed by computer 110, including both volatile and nonvolatile, removable and non-removable media.

Computer 110 may operate in a networked environment using logical connections to one or more remote computers, such as remote computer 180. Remote computer 180 may be a personal computer, a server, a router, a network PC, a peer device or other common network node, and typically includes many or all of the elements described above relative to computer 110. The logical connections depicted in FIG. 1 include local area network (LAN) 171 and wide area network (WAN) 173, but may also include other networks. Such networking environments may be common in offices, enterprise-wide computer networks, intranets, and the Internet.

When used in a LAN networking environment, computer 110 may be connected to LAN 171 through network interface 170. When used in a WAN 173 networking environment, computer 110 may include modem 172 for establishing communications over WAN 173, such as the Internet. Modem 172 may be connected to system bus 121 via user input interface 160, or other appropriate mechanism.

Computer 110 or other client device can be deployed as part of a computer network. In this regard, various embodiments pertain to any computer system having any number of memory or storage units, and any number of applications and processes occurring across any number of storage units or volumes. An embodiment may apply to an environment with server computers and client computers deployed in a network environment, having remote or local storage. An embodiment may also apply to a standalone computing device, having programming language functionality, interpretation and execution capabilities.

Figure 2:
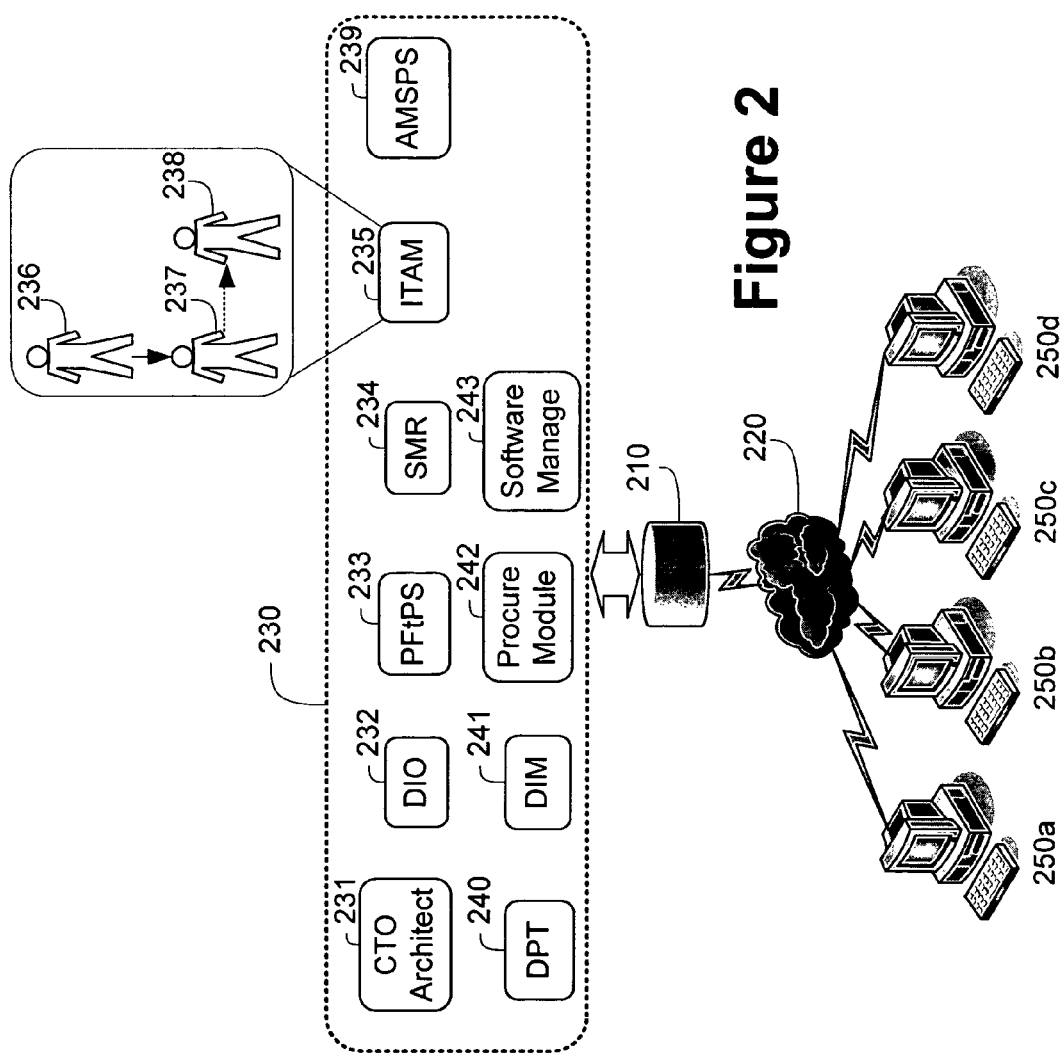
FIG. 2 illustrates an example arrangement of components in a software management system.

FIG. 2 illustrates an example arrangement of components in a Software Management System (SMS). Each of the components may be any combination of software and/or hardware. Alternatively, the functions of any of the components illustrated in FIG. 2 may be carried out by a person who has a defined role with respect to software license management. For example, and as will be described in detail below, Platform Owner (PO) 236, Application Owner (AO) 237 and Application Owner Delegate (AOD) 238 may all be personnel who have one or more software license management responsibilities. Thus, it will be appreciated that the arrangement illustrated in FIG. 2 may involve any combination of automated and/or human components.

Clients 250a-d represent computing devices (e.g., desktop or laptop computers, workstations and the like) on which any number of software applications may reside. Clients 250a-d may be operatively connected to Installed Applications Database (IAD) 210 by way of network 220. Network 220 may be any type of computing network such as, for example, the Internet, an intranet, a LAN, WAN or the like.

IAD 210 may be any type of mechanism (such as a software application or the like) that prevents the unrestricted installation of software from the SMS. Typically, the SMS permits the packaging of desktop software for automated distribution or zero-touch provisioning without regard to licensing restrictions. IAD 210 therefore enforces the software licensing terms. IAD 210 also may require that certain rules are to be followed if, for example, a new license is to be issued, a new software application is to be purchased, etc. IAD 210 may also enable integrated security features that control access to sensitive information such as, for example, purchase orders, keys, etc. Also, IAD 210 may permit export capability, as well as logging and tracking capabilities.

IAD 210 may be in operative communication with, or may interact with any of modules 230. As noted above, any of modules 230 may be any combination of hardware or software, and may be a human member of an organization with one or more software license management responsibilities.

In an embodiment, CTO Architecture 231 ensures that newly-introduced, licensed software is compliant with the existing operating systems on, for example, clients 250a-d. Desktop Infrastructure Operations (DIO) 232 manages the process for managing controlled and trusted-site internet downloads.

PO 236 manages the licensed software installed on the IT equipment within the PO's 236 assigned platform. The platforms may include, for example: desktop, server, mainframe and the like. Also, PO 236 may be responsible for identifying an AO 237 for each licensed software product. AO 237 may be, for example, an IT manager or the like who has accepted responsibility for ensuring that licensed software usage complies with the terms and conditions negotiated in the licensing contract, within the purchase order, etc. PO 236 and AO 237 may be the same person, or may comprise more than one person for each role. An AO 237 also may be responsible for approving acquisition or installation requests, and may determine the appropriate method of either harvesting unused licenses from stock, or via a contract, purchase or the like.

AO 237 may be authorized to identify an AOD 238 who is jointly responsible for performing AO 237 responsibilities (i.e., AO 237 may delegate his or her responsibilities to AOD 238).

Product Planning and Support (PFtPS) 233 creates and maintains—either manually or in an automated fashion—software records in Software Management Repository (SMR) 234. SMR 234 may be a database or some other data repository. The records stored in SMR 234 may contain information such as, for example: an identification of AO 237, AOD 238 (if applicable) and PO 236, as well as software-related information (e.g., manufacturer, product name, version, platform, functional category, and various operational approval flags used for software request routing).

IT Asset Management (ITAM) 235 may be responsible for software reporting, development and support of processes and cross-functional personnel involved with managing licensed software. Asset Management Systems Product Support (AMSPS) 239 may be responsible for supporting the IT Asset Management auto discovery inventory (using, for example, a tool such as Eracent™ or the like), and work order tools (such as Quantum™ or the like). Desktop Packaging Team (DPT) 240 may be responsible for determining the appropriate method for packaging desktop software using the SMS infrastructure. Desktop Infrastructure Management (DIM) 241 may be responsible for identification of workstation policies and providing analysis of new requests for desktop software services, and manages IAD 210 to automate license validation prior to distribution of licensed desktop software.

Procurement Module 242 may include personnel who are responsible for negotiating contracts and generating purchase orders. Alternatively, Procurement Module 242 may be an automated process that acquires software or software licenses upon being directed to do so, either manually, or by another automated process. Procurement Module 242 may also record licensed software contract terms, conditions, etc., in SMR 234. These contract terms may then be used by AO 237 and/or AOD 238 to manage software use for the term of the executed contract or maintenance agreement. Software Management Module 243 may be any type of software and/or hardware component that may be used to, for example, monitor software usage and license compliance within an organization (e.g., Eracent™), to process work orders (e.g., Quantum™) or the like.

Figure 3:
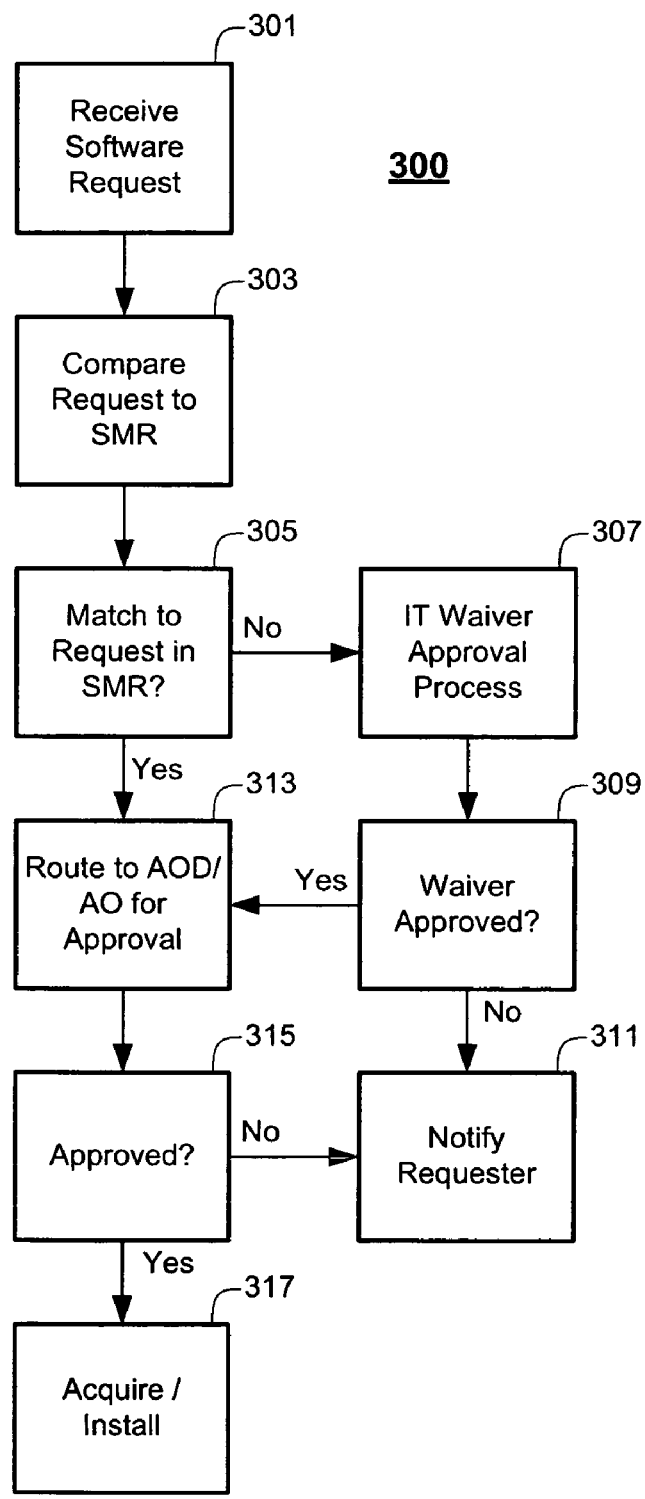
FIG. 3 is a flow diagram of an example method of handling a software request.

FIG. 3 represents an example method 300 of handling a software request according to one embodiment. References will be made to FIG. 2 as appropriate. At step 301, a software request is received by, for example, IAD 210, SMR 234, AOD 236, AO 237, PO 236, and any other in the role process shown in FIG. 2, or the like. Such a request may be originated by, for example, a user of one of clients 250a-d. Alternatively, a request may be initiated by PO 236, AO 237 and/or AOD 238. It will be appreciated that such a request may be generated electronically (e.g., using email, an intranet web site, a software procurement—specific electronic interface, etc.) or manually (e.g., filling out a paper-based request form).

At step 303, the software request is compared to the data stored in SMR 234. Such a comparison may involve any type of software or license-related data. For example, the comparison may involve first checking to see if the requested software is already on the system. If so, a next comparison may involve determining whether an unused license for the requested software is available (i.e., the request may be satisfied via the "stock" of licenses).

In addition SMR 234 may contain one or more flags that determine if the requested software requires IT waiver processing, AO 237/AOD 238 notification only, AO 237/AOD 238 approval, a license to be purchased and determines approving authorities for the request. Thus, it will be appreciated that the comparison may involve the comparison of more than one type of data.

At step 305, a determination is made as to whether a match has been found between the software request and an entry in SMR 234 (with respect to the request). For example, if a software license for the requested software is available for use, a match may be indicated. If the request is for software that is not currently installed anywhere on the system, and therefore would need to be acquired, then a match may not be indicated. Alternately, even if a license for the requested software is available, SMR 234 may not indicate a match for one or more other reasons. For example, the request may be for a software application that is not related to the requestor's line of work. As a result, SMR 234 may indicate that a match did not occur. Thus, the determination of whether a "match" occurs may involve any number of factors.

If the determination of step 305 is that there is a match to an entry in SMR 234 (e.g., an unused license for the software is available), method 300 proceeds to step 313, as will be discussed below. If the determination of step 305 is that there is not a match to an entry in SMR 234, then method 300 proceeds to IT waiver approval process at step 307 by CTO Architect 231, for example. The IT waiver approval process of step 307 may involve any number of automated or manual steps to determine whether a waiver should be granted. A waiver, as used herein, generally refers to any software application or license addition, or one or more exceptions to any rules set up in SMR 234 or the like.

In one embodiment, an approval authority (such as, for example, PO 236, AO 237 and/or AOD 238) may receive a notification of the waiver request by way of, for example, a batched email notifying him or her of the pending waiver request(s). Alternately, the approval authority can review pending requests using an electronic interface (e.g., intranet web site, etc.), paper review, or the like, and does not have to rely on receiving an email notification. In an embodiment in which Quantum is used, a Quantum work order may be updated with a status of the waiver request from, for example, a waiver approval site.

At step 309, a determination is made as to whether the waiver has been approved. If the determination of step 309 is that a waiver has not been approved, then at step 311 the requestor is notified that the request was not approved. In one embodiment, such a notification is by way of email, but any other type of communication is consistent with an embodiment. The notification may include additional information (such as, for example, instructions on how to appeal the decision or a request to provide additional justification to the approval authority, etc.).

If the determination of step 309 is that a waiver has been approved, method 300 proceeds to step 313. At step 313, the request is routed to AO 237, AOD 238 or PO 236 for approval and identification of an acquisition method. At step 305 the system may route the request for owner approval automatically. At step 313 the owner may manually select the appropriate response (purchase, install without purchase, decline, etc.). A notification, such as an automated email, may be sent to the requestor to notify the requestor of the pending approval. In one embodiment, AOD 238 may have a predetermined period of time in which to approve the request. If approval is not received within the predetermined period of time, the request may be escalated to AO 237, possibly with email notification. AO 237 may then have a predetermined period of time to approve the request at which time it will systematically be escalated to PO 236 for resolution. It will be appreciated that some requests may require approval from more than one entity. For example, for a major request (e.g., for a large number of licenses or a very expensive software application, etc.), AOD 238 may be required to first recommend approval to AO 237, who may then be required to recommend approval to PO 236, who then makes the approval decision. In addition, there may be further approval required prior to final purchase of the software product. For example, if the software product exceeds a predetermined price, additional higher level approval may be required. Any such situation is consistent with an embodiment.

AO 237, AOD 238 or PO 236 review and approve or disapprove the request using, for example, an approver web tool or the like that systematically (e.g., hourly, daily, weekly, etc.) populates a Quantum™ work order or the like with the status and task updates needed to continue with routing of the request. AOD 238/AO 237 may identify the acquisition method using an approver web tool, or such identification may be made automatically. For example, if unused licenses are available, approval may be made via "stock." If a purchase is required, AOD 238/AO 237 may approve the request for a purchase order. Alternately, AOD 238/AO 237 can deny a request, which would result in an automated cancellation email, or the like, to the requester, and an automated cancellation of the Quantum™ work order, if applicable.

At step 315, a determination is made as to whether approval has been granted. If the determination of step 315 is that approval has not been granted, then method 300 proceeds to step 311, at which point the requestor is notified of the disapproval, as discuss above.

If the determination of step 315 is that approval has been granted, then the software and/or license is acquired (if necessary) and installed (or activated) on the appropriate client 250*a-d* for which the request was generated at step 317. Step 317 may involve any number of steps. For example, if a new software application is being acquired, SMR 234 may need to have a new entry for the software, an AO 237, AOD 238 and/or PO 236 may need to be assigned, and the like. Such a process may be performed by, for example, PFtPS 233 as discussed above in connection with FIG. 2. The entry in SMR 234 may include, for example: the software manufacturer, product name, version, platform, functional category, and AO 237, AOD 238 and/or PO 236 assigned to the software (each of whom may be identified by employee ID, name, or the like). After a contract or purchase order is completed, the SMR 234 record may be updated completed by, for example, PeopleSoft™, a contract manager or the like.

The acquisition of a software application, license(s) or the like may take place in any manner. For example, in one embodiment the acquisition may be carried out by one or more employees of the organization that is attempting to acquire the software. In another embodiment, the acquisition may be performed automatically using an enterprise software application or the like. Any type of automated or manual bookkeeping may also take place in connection with step 317, such as the recordation of a purchase record number, vendor, license type and grant, status, purchase record type, permitted uses, cost, quantity ordered, start/end maintenance dates, comments, the contract manager name (if applicable), etc.

The actual installation of the software may be automated (e.g., transmitting the software to client 250*a-d* via network 220 and directing client 250*a-d* to install the software), or may be performed manually (e.g., an IT person may install the software on client 250*a-d*), or some combination thereof.

Figure 4:
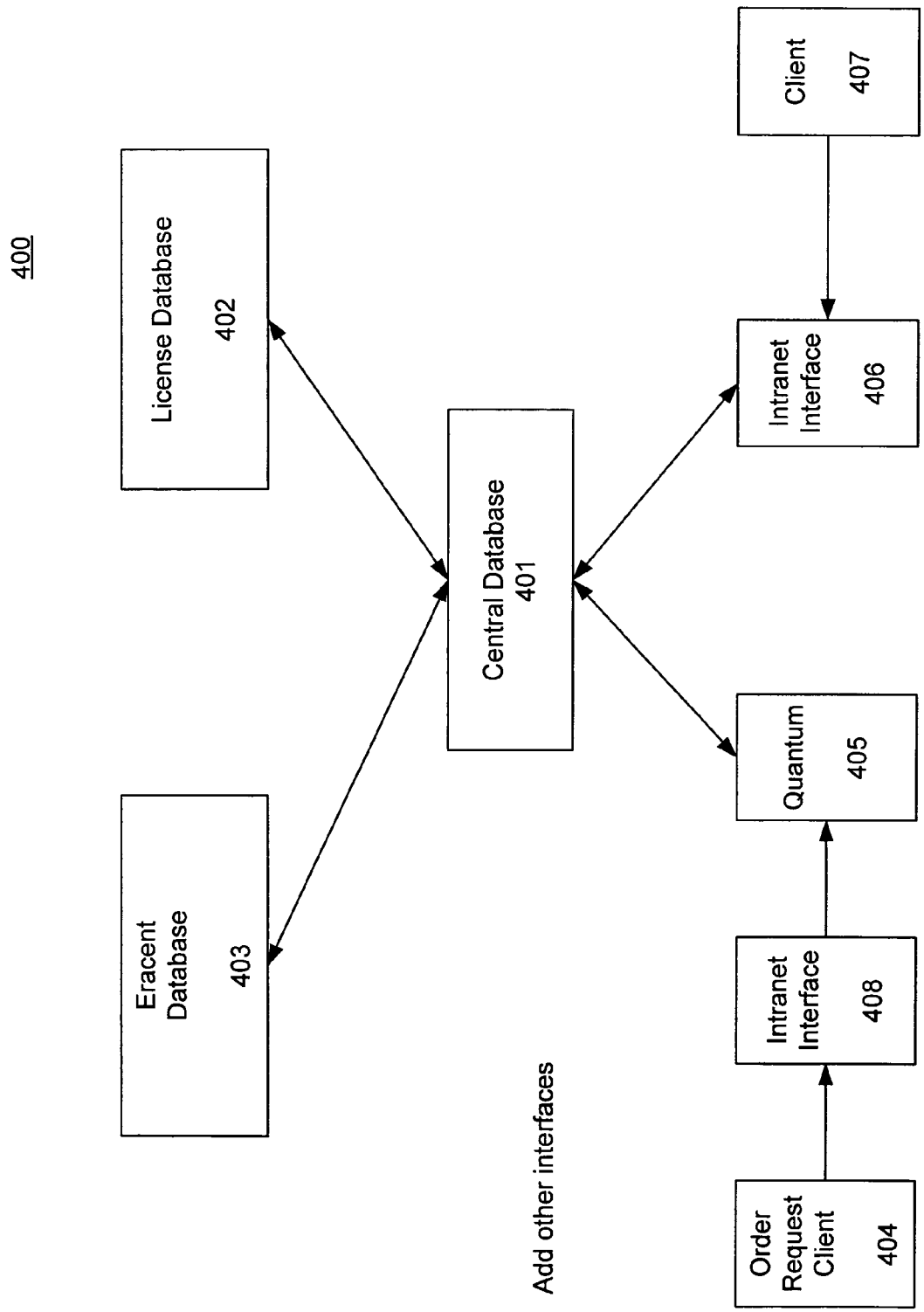
FIG. 4 is a block diagram of a system for managing licensed commodities.

FIG. 4 is a block diagram of a system 400 for managing licensed commodities. As shown in FIG. 4, system 400 includes a central database 401 and a license database 402. It should be appreciated that although various components and databases are shown in FIG. 4, the functionality described herein is for example only, and may be divided out among the databases in a manner different than that described. For example, the functionality described with reference to license database 402 may be done by central database 401, and vice versa.

License database 402 may include the terms of a license agreement associated with the software. Also, central database 401 may also include a data store for storing information related to software and for associating a licensing term with the software. Central database 401 may have a number of interfaces that communicate with various existing and/or new systems. For example, central database 401 may include a first interface for communicating with an application owner system, a second interface for communicating with an asset management system, and a third interface for communicating with client device 407. Also, central database 401 may include a processor that processes a request for the software received from the client device.

Central database 401 may include a fourth interface for automatically discovering software on a network in communication with the data store, for example an Eracent™ database 403. Central database 401 also may include a fifth interface for communicating with a work order database, for example, an Quantum™ database 403. Quantum™ database 403 may have a dedicated order request client 404 that allows a user to generate a particular work order via intranet interface 408. Central database 401 also may be in communication with a system for generating purchase orders, and/or an accounting system.

Central database 401 may store a number of characteristics of the software management system, include a quantity of installations of the software, and any purchasing activity related to the software. Also, central database 401 may store information relating to other specifics of the software, including an owner, manager, platform, and/or use of the software. Also, central database 401 may have a processor that determines a routing of information related to the software between the interfaces.

Central database 401 may include an output module for providing data to be displayed on client 407, including information associated with the request, determination, and confirmation of the software. Also, central database 401 may have an interface that identifies if an authorized or unauthorized installation of the software occurs on any client 407.

Client device 407 may include a selection module that allows a user to select a particular software application. Selection may be made by traditional methods including text entry and/or drop-down menus. It should be appreciated that the request may include any communication related to the particular software application. For example, some embodiments may contemplate installation of a software application that is new to the organization. Also, installation may be of a software application that previously has been used and ordered by the organization. Also, the request includes removal of an existing software application and/or updating of an existing software application. Also, the request includes transfer of an existing software application from one device to another. The above examples are meant to provide a brief description of that which is contemplated by the disclosed embodiments, and is not meant to be limiting.

Client device 407 also may include components for transmitting and receiving data related to the software request. For example, client device 407 may transmit the request for the software application over the network to a central database 401 via an intranet interface 406. Also, client device 407 may receive from central database 401 a determination with regard to the requested software. This determination may be made with respect to a predetermined licensing term that may be store within central database 401 and associated with the software requested by client device 407. The determination may include an approval, a disapproval and/or request for information, just to list a few non-limiting examples.

As a result of the request submitted by client device 407 and approved via central database 401 routing to an approval authority, the software automatically may be installed. Eracent 403 checks with or inventories client device 407 to provide to central database 401 a record or signal indicating that the software successfully was installed and therefore updating central database 401. Also, client device 407 may receive some confirmation that the transmitted request includes the information required to be able to process the request, and/or a request for additional information. Also, client device 407 may be capable of displaying information relating to the selecting of the software application, the transmitting of the request, and/or the receiving of the determination, as well as any other information or communication relating to the transaction.

Although not shown in FIG. 4, it should be appreciated that central database 401 may have interfaces to other modules. For example, an interface to a system alert module may be provided to indicate overall process failures and/or that a process owner has not complied with a particular process. Also, an interface to a waiver module may be provided to indicate software evaluated for compliance with preconditions, like an operating system, for example.

Figure 5:
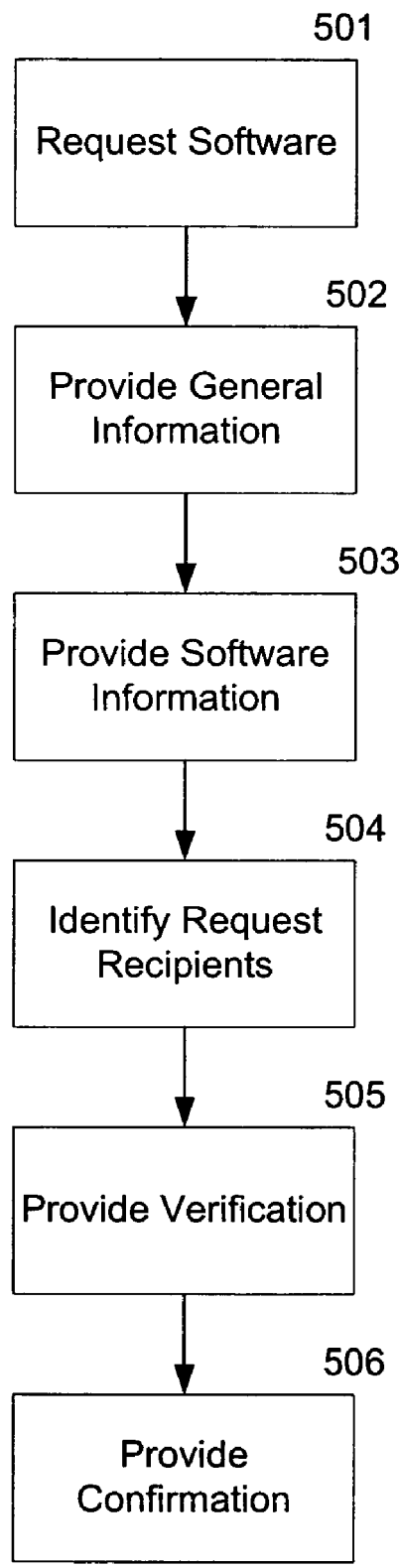
FIG. 5 is a flow diagram of a method for managing licensed commodities.

FIG. 5 is a flow diagram of a method 500 for managing a licensed commodity, like computer hardware or software for example. Although the following example is described in the context of a software commodity, it should be appreciated that the commodity may include any licensed product, including computer hardware, for example. Also, the disclosed embodiments contemplate licensed commodities other than computer-related products.

As shown in FIG. 5, method 500 may begin with a request for software 501. Software request 501 may be made for example by a client device in communication with a licensing database via a network. The client device may be a typical personal computing device and/or a dedicated terminal.

After the request for software in 501, general information is provided at 502. General information 502 may be entered by a client device using data entry fields. One example of such data entry fields is illustrated in FIG. 6. Although FIG. 6 shows just one example of such a data entry field 600 for general information, it should be appreciated that such fields may include fields other than shown in FIG. 6. Also, the fields may be entered using more than one data entry screen.

General information 502 may include, for example, a type, name or manufacturer of the software. General information 502 also may include a requested delivery date of the software. General information 502 may include certain information related to the client or entity making the request 601, including for example, the requestor's name, employee identification number, and contact information (e.g., telephone, email address, etc.). In addition, general information 502 may include details regarding billing information 602. Such billing information 602 may include certain codes related to the organization's accounting system, like a project code or job order number. In addition, general information 502 also may include the type of platform 603 on which the software will be installed, for example a desktop, laptop mainframe, and/or server platform, for example. General information 502 data entry field may also include screen navigation buttons 604 that permit the user to cancel the request or to navigate to the next or previous data entry fields. The data may be prepopulated with information provided via a human resources interface and/or data store.

After the general information is provided at 502, software information is provided at 503. Software information 503 may be entered by a client device using data entry fields. One example of such data entry fields will be discussed generally with reference to FIG. 7. Although FIG. 7 shows just one example of such a data entry field 700 for software information 503, it should be appreciated that such fields may include fields other than shown in FIG. 7. Also, the fields may be entered using more than one data entry screen.

As shown in FIGS. 5 and 7, software information 503 may permit the entry of data related to the software or other commodity itself. For example, such information may have a field 701 that permits the user to identify the name, type and quantity of the software requested. In some embodiments, the software information 503 data entry screen also may allow the user to search for a particular software by, for example, title, manufacturer or type (e.g., word processing, drafting, network tools, etc.). Software information 503 may have certain predetermination selections presented via "drop down" menus. Also, software information 503 may allow the user to conduct text searches. The software information 503 data entry screen may allow the user to add certain selections to a shopping cart or selection list 702, so as to permit multiple software products.

Typically, the software products made available to the user via software information 503 data entry screen are predetermined based on prior approval, available licenses, etc. In some embodiments, a user may be able to make selections not included in such predetermined lists. For example, in some embodiments, if the requesting client requests a software product that is not available, for example because it has not yet been authorized by the organization, a special waiver or approval may be required. Such special approval may dictate the need for additional software information, provided either on the same data entry screen field 701 or an additional data entry. Such additional software information 503 may include the type of waiver or approval, the party required to approve the request (e.g., Executive Director). In addition, the additional software information 503 may also require the entry of text to justify approval (e.g., a business case).

Figure 8:
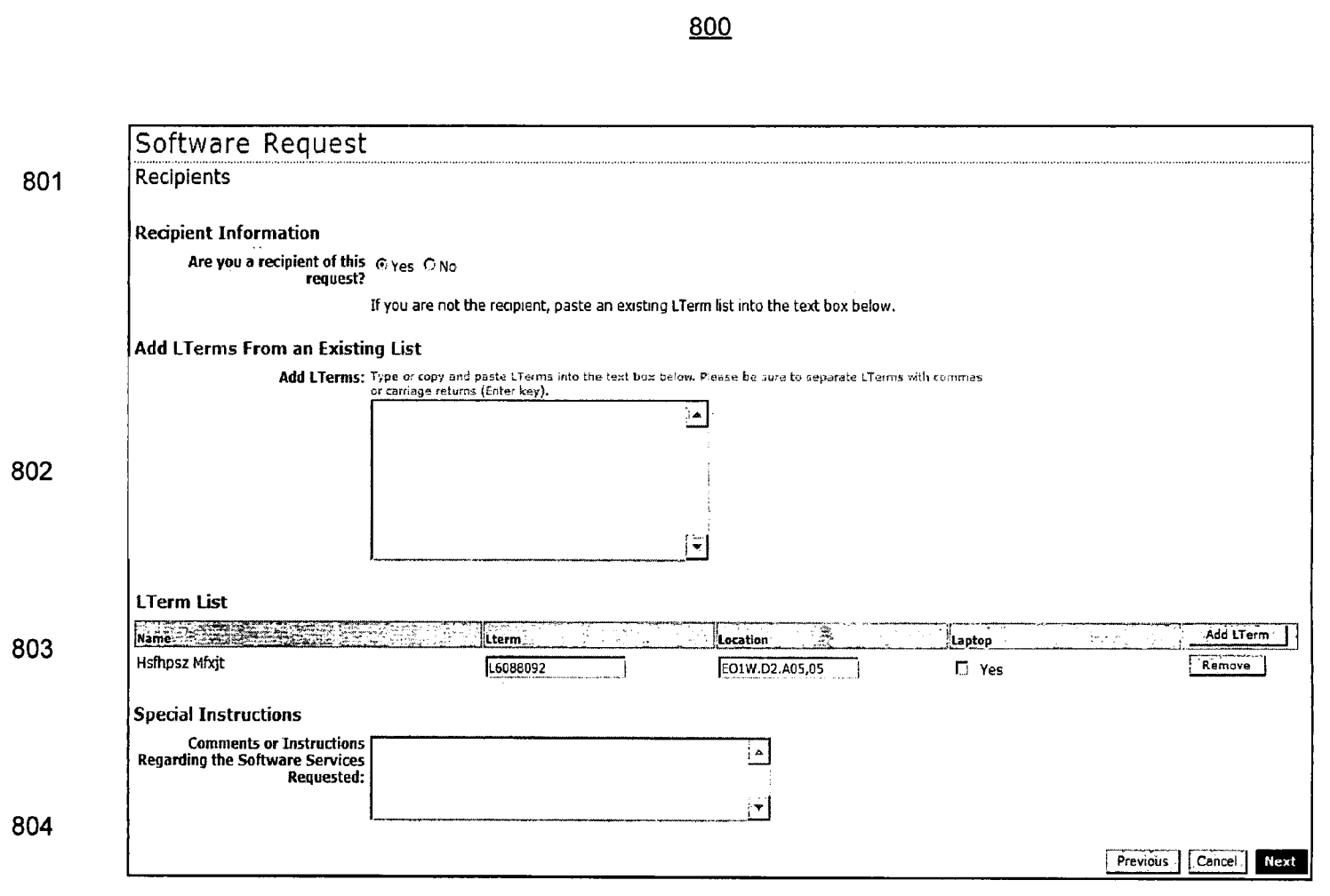

After the software information is provided at 503, request recipients are identified at 504. One example of such data entry fields will be discussed generally with reference to FIG. 8. Although FIG. 8 shows just one example of such a data entry field 800 for identifying request recipients 504, it should be appreciated that such fields may include fields other than shown in FIG. 8. Also, the fields may be entered using more than one data entry screen.

As shown in FIGS. 5 and 8, request recipients 504 may permit the entry of data related to the software or other commodity itself. At 504, field 801, for example, allows the person or entity receiving the software to be identified. Such persons may be the same as or different than the persons requesting the software (e.g., for example where an organization has dedicated requesting personnel). Request recipient identification 504 also have fields 802 and 803 that identify the device or computer that will receive the software installation, as well as a special instructions field 804 regarding the purchase or installation (e.g., install software after normal working hours).

After request recipients are identified at 504, verification is provided at 505. One example of such data entry fields will be discussed generally with reference to FIG. 9. Although FIG. 9 shows just one example of such a data entry field 900 for verification 505, it should be appreciated that such fields may include fields other than shown in FIG. 9. Also, the fields may be entered using more than one data entry screen.

As shown in FIG. 9, data entry screen 900 associated with verification may permit the user to view and perhaps correct the data entered as part of the software request prior to submitting the form. If changes are required, the user may be prompted to make such changes directly on the verification screen or by returning to the previous data entry screens. Once the user has verified that the entered information is correct, the user may submit the request for further processing and eventual approval routing.

After verification is provided at 505, confirmation is provided at 506. Confirmation 506 may include a message displayed to the user indicating that the request was successfully submitted and moved along to the approval process. The message may be provided to multiple parties. For example, the confirmation message may be provided to the requestor, the requestor's supervisor, and the person or entity that will be using the software. Such a message may be provided by conventional means such as a confirmation email. The confirmation communication may include a unique number so that any of the members of the organization can track the progress of the request.

Figure 10:
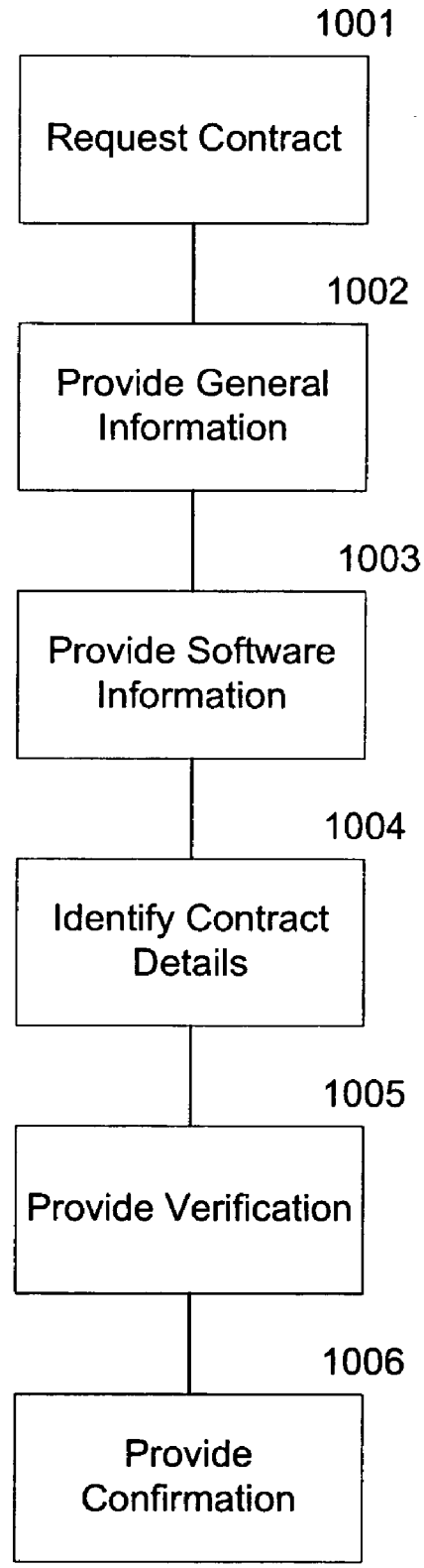
FIG. 10 is a flow diagram of a method for requesting contract terms associated with negotiations related to software request.

FIG. 10 is a flow diagram of a method for requesting contract terms associated with negotiations related to a software request. As is known to those skilled in the art, often contracts are negotiated and executed in order to make a software purchase, software renewal and/or to enter into a software maintenance agreement. Such maintenance agreements are more common to software designed for servers and mainframes. Although the following example is described in the context of a software commodity, it should be appreciated that the commodity may include any licensed product, including computer hardware. Also, the disclosed embodiments contemplate licensed commodities other than computer-related products.

As shown in FIG. 10, the contract request process begins at 1001 with a request for a contract initiation action. After the contact initiation at 1001, at 1002 general information is provided. General information 1001 may be entered by a client device using data entry fields. One example of such data entry fields is illustrated in FIG. 11. Although FIG. 11 shows just one example of such a data entry field 1100 for general information, it should be appreciated that such fields may include fields other than shown in FIG. 11. Also, the fields may be entered using more than one data entry screen.

General information 1002 may be obtained via a data entry field 1100 having certain subfields including a subfield 1101 obtaining information related to the requestor of the contract and/or a point of contact for the contract request. Such information may include the requestor's name, phone number, email and other contact information. Also, requestor information may include organization-specific data like an employee number, the requestor's supervisor. The data may be pre-populated with information provided via a human resources interface and/or data store.

Also, general information 1002 may include a subfield 1102 describing particular approval authority requirements, as well as the individual approval authority entity. General information also may provide such information relating to billing information, the particular platform on which the software will reside, as well as any special instructions or screen navigation buttons.

General information 1002 also may include a performance evaluator subfield 1103. Performance evaluator subfield 1103 may identify an entity or person responsible for reviewing the contract request for possible approval or disapproval. Subfield 1103 may include the evaluator's name, title, department, phone and email.

After general information 1002 is provided, software-specific details may be provided at 1003 and contact-specific details may be provided at 1004. For example, such information may permit the user to identify the name, type and quantity of the software requested. In some embodiments, software information 1003 also may allow the user to search for a particular software by, for example, title, manufacturer or type (e.g., word processing, drafting, network tools, etc.). Software information 1003 also may have certain predetermination selections presented via "drop down" menus. Also, software information 1003 may allow the user to conduct text searches. The software information 1003 may allow the user to add certain selections to a shopping cart or selection list, so as to permit multiple software products.

Also, at 1004 contract-specific details may be provided. Contract information 1004 may include information of the contract relating to a technical review and the parties responsible for the review, as well as any maintenance information related to the software product. Also, contract information may include licensing terms and purchase order information. Also, contract information 1004 may include information related to the request, as well as information related to the type of contract sourcing (e.g., single, sole source, best price, etc.). The contract specific information may come into the system via a PeopleSoft™ or an enterprise contract management system.

After contract-specific details are provided at 1004, verification may be provided at 1005 via data entry fields. One example of such data entry fields will be discussed generally with reference to FIG. 12. Although FIG. 12 shows just one example of such a data entry field 1200 for verification 1005, it should be appreciated that such fields may include fields other than shown in FIG. 12. Also, the fields may be entered using more than one data entry screen.

As shown in FIG. 12, data entry screen 1200 associated with verification may permit the user to view and perhaps correct the data entered as part of the contract request prior to submitting the form. If changes are required, the user may be prompted to make such changes directly on the verification screen or by returning to the previous data entry screens. Once the user has verified that the entered information is correct, the user may submit the request for further processing and eventual approval routing.

After verification is provided at 1005, confirmation is provided at 1206. Confirmation 1206 may include a message displayed to the user indicating that the contract request was successfully submitted and moved along to the approval process. The message may be provided to multiple parties. For example, the confirmation message may be provided to the requestor, the requestor's supervisor, and the person or entity that will be enforcing and/or using the contract. Such a message may be provided by conventional means such as a confirmation email. The confirmation communication may include a unique number so that any of the members of the organization can track the progress of the request.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A database system for managing licensed commodities, comprising:
    a first subsystem for storing information related to a plurality of different software applications in a database of a software management system comprising a data store, the information comprising a platform for each of the software applications and a use of each of the software applications;
    a second subsystem for associating a licensing term with each of the software applications;
    a third subsystem for communicating with an owner system, an asset management system, and a plurality of client devices via a plurality of interfaces of the database; and
    a fourth subsystem for processing a request for one of the software applications, and the platform and the use of the one of the software applications, received at the software management system from one of the plurality of client devices.

2. The system of claim 1, further comprising a fifth subsystem for discovering software on a network in communication with the data store.

3. The system of claim 1, further comprising a sixth subsystem for communicating with a purchasing system.

4. The system of claim 1, further comprising a seventh subsystem for storing in the database at least one of the following: a quantity of installations of each of the software applications, a purchasing activity related to each of the software applications, owners of each of the software applications, and a software package name for each of the software applications.

5. The system of claim 1, further comprising an eighth subsystem for determining a routing of information related to each of the software applications between the interfaces.

6. The system of claim 1, further comprising a ninth subsystem for displaying information associated with each of the software applications.

7. The system of claim 1, further comprising a tenth subsystem for identifying an unauthorized installation of the one of the software applications.

8. A method for managing licensed commodities, comprising:
    storing information related to a plurality of different software applications in a database of a software management system comprising a data store, the information comprising a platform for each of the software applications and a use of each of the software applications;
    associating a licensing term with each of the software applications;
    communicating with an owner system, an asset management system, and a plurality of client devices via a plurality of interfaces of the database;
    processing a request for one of the software applications, and the platform and the use of the one of the software applications, received at the software management system from one of the plurality of client devices; and
    storing in the database at least one of the following: a quantity of installations of each of the software applications, a purchasing activity related to each of the software applications, owners of each of the software applications, and a software package name for each of the software applications.

9. The method of claim 8, further comprising discovering software on a network in communication with the data store.

10. The method of claim 8, further comprising communicating with a purchasing system.

11. The method of claim 8, further comprising determining a routing of information related to each of the software applications between the interfaces.

12. The method of claim 8, further comprising displaying information associated with each of the software applications.

13. The method of claim 8, further comprising identifying an unauthorized installation of the one of the software applications.

14. A non transitory computer-readable medium having computer-executable instructions for managing licensed commodities, the computer-executable instructions performing:
    storing information related to a plurality of different software applications in a database of a software management system comprising a data store, the information comprising a platform for each of the software applications and a use of each of the software applications;
    associating a licensing term with each of the software applications;
    communicating with an owner system, an asset management system, and a plurality of client devices via a plurality of interfaces of the database;
    processing a request for one of the software applications, and the platform and the use of the one of the software applications, received at the software management system from one of the plurality of client devices; and
    storing in the database at least one of the following: a quantity of installations of each of the software applications, a purchasing activity related to each of the software applications, an owner of each of the software applications, and a manager of each of the software applications.

15. The computer-readable medium of claim 14, wherein the computer-executable instructions further perform discovering software on a network in communication with the data store.

16. The computer-readable medium of claim 14, wherein the computer-executable instructions further perform communicating with a purchasing system.

17. The computer-readable medium of claim 14, wherein the computer-executable instructions further perform determining a routing of information related to each of the software applications between the interfaces.

18. The computer-readable medium of claim 14, wherein the computer-executable instructions further perform displaying information associated with each of the software applications.

19. The computer-readable medium of claim 14, wherein the computer-executable instructions further perform identifying an unauthorized installation of the one of the software applications.

\* \* \* \* \*